Figure 1:
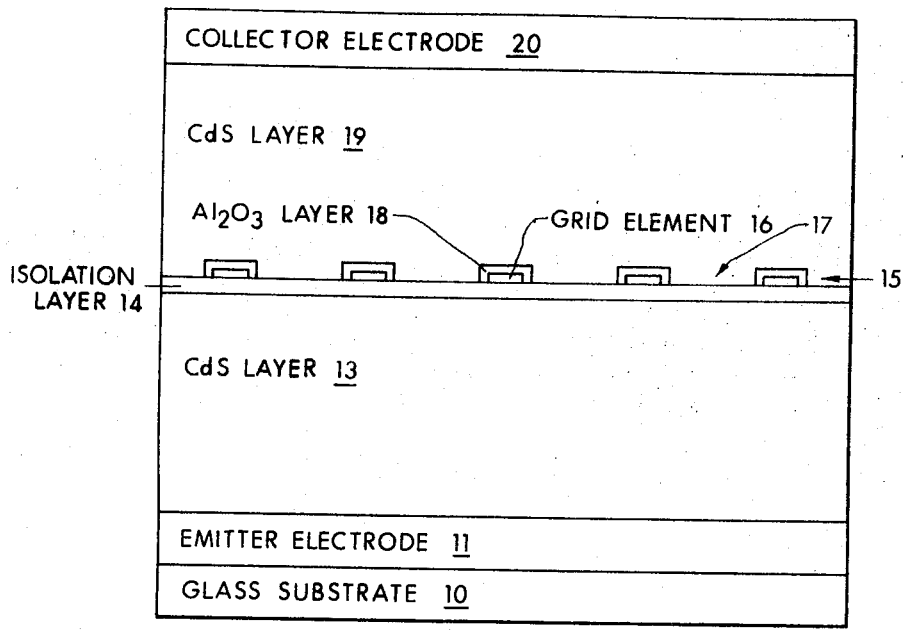

United States Patent
Aponick, Jr. et al.

[15] 3,680,204
[45] Aug. 1, 1972

[54] SOLID STATE DEVICE

[72] Inventors: Anthony A. Aponick, Jr., Williamsport, Pa.; James G. Gottling, Columbus, Ohio

[73] Assignee: Massachusetts Institute of Technology, Cambridge, Mass.

[22] Filed: Dec. 12, 1969

[21] Appl. No.: 889,805

Related U.S. Application Data

[62] Division of Ser. No. 557,831, June 15, 1966.

[52] U.S. Cl. ................................29/571, 29/576
[51] Int. Cl. ..................B01j 17/00, H011 7/00
[58] Field of Search ............29/571, 576; 317/21.1

[56] References Cited

UNITED STATES PATENTS

| | | | |
|---|---|---|---|
| 3,258,663 | 6/1966 | Weimer | 317/235 |
| 2,208,455 | 7/1940 | Glaser et al. | 317/235 |
| 2,648,805 | 8/1953 | Spenke et al. | 317/235 |
| 2,728,034 | 12/1955 | Kurshan | 317/235 |
| 2,968,750 | 1/1961 | Noyce | 317/235 |
| 3,370,184 | 2/1968 | Zuleeg | 317/234 X |

*Primary Examiner*—John F. Campbell
*Assistant Examiner*—W. Tupman
*Attorney*—Thomas Cooch, Robert F. O'Connell and Martin M. Santa

[57] ABSTRACT

A method of making a three terminal solid state device analogous to a vacuum tube triode is described. The device has a body of material, such as cadmium sulfide, capable of supporting a space-charge-limited current provided by an emitter electrode. A collector electrode is capable of receiving current carriers from such space charge region. A control electrode is located within said body of material to control the flow of current to the collector electrode. The control electrode is a grid having apertures of approximately 3000 A. diameter.

5 Claims, 2 Drawing Figures

INVENTORS, JR.
ANTHONY A. APONICK,
JAMES G. GOTTLING

BY

ATTORNEY

SOLID STATE DEVICE

This application is a division of application Ser. No. 557,831, filed June 15, 1966 for Field-Effect Space-Charge Limited Solid State Thin-Film Device.

This invention relates generally to solid state devices and more particularly to solid state, thin-film devices operating under space-charge-limited current conditions and having a grid, or control, electrode for achieving a field-effect control, or modulation, of the space-charge-limited current thereof.

Analogous to vacuum tube triodes, such devices can be designated as space-charge-limited triodes, i.e., three-terminal, solid state devices utilizing a body of material capable of supporting a space-charge-limited current and having a first emitter, or source, electrode for injecting majority current carriers into said body of material to form a space charge region; a second collector, or drain, electrode for receiving current carriers from such space charge region, such electrodes being capable of having potentials applied thereto so as to generate a space-charge-limited current; and a grid, or control, electrode within said body of material for controlling the characteristics of such space-charge-limited current. The grid configuration must be such that it does not itself inject or withdraw current carriers into or from said body of material and is in that sense isolated from the emitter and collector electrodes and from said body. Analogous to vacuum tube terminology then, no grid current is drawn when the device is operative.

The solid state triode of this invention provides a space-charge-limited current which is in a direction normal to the plane of the body of material utilized therein. For such a configuration, the transit times involved in the flow of electrons from emitter to collector are substantially less than those required during conventional transistor operation and, hence, the frequency response of such devices will be greatly improved over conventionally known transistors. In addition, such space-charge-limited triodes have high resistance characteristics and greater temperature stability since the number of current carriers available under space-charge-limited current conditions is fairly independent of temperature. Such characteristics, therefore, provide inherently lower noise levels than those achieved in conventionally known transistors. In addition, the gain-bandwidth product of such devices should be improved over those of conventionally known transistors under many conditions of operation. Additionally, for equivalent frequency response, the electrodes and the electrode spacings in such a space-charge-limited triode can be larger than those for conventional transistors. Therefore, the high frequency, space-charge-limited triode of this invention should be electrically more "robust" than high frequency transistors.

This invention provides such a device by utilizing cadmium-sulfide (CdS) material having a sufficient resistivity to support a space-charge-limited current. A grid structure is formed between two layers of such CdS material so as to produce very high resistance, or "blocking," contacts at its boundaries with the CdS material. The formation of such blocking contacts prevents the injection or withdrawal of current carriers as specified above.

In general, the triode configuration of the invention utilizes a metallic emitter electrode, such as gold, indium or gallium, deposited on a suitable substrate, such as glass, with a first layer of high resistivity CdS material deposited thereon. A grid structure, which in one preferred embodiment is formed of aluminum, is thereupon formed on such CdS layer as an appropriate mesh-like, or lattice, structure which is isolated from (i.e. in blocking contact with) such CdS layer. A second CdS layer is thereupon deposited on such grid structure, the grid structure also being isolated from such upper CdS layer by the formation of a suitable blocking contact therewith as specified more completely below. A metallic collector electrode, such as gold, gallium or indium, for example, is thereupon deposited on such upper CdS layer to complete the device.

Figure 2:
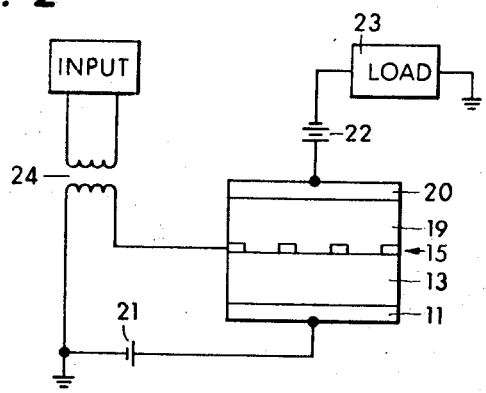

A particular detailed structure of the device of the invention and a method for forming said device is discussed more completely below with reference to the accompanying drawing in which:

FIG. 1 illustrates a diagrammatic view of one particular embodiment of a solid-state triode device in accordance with this invention; and FIG. 2 shows a simple circuit diagram for describing the operation of the device shown in FIG. 1.

As can be seen in the particular preferred embodiment shown in FIG. 1, a glass substrate 10 has deposited thereon an emitter electrode 11, such as gold, indium or gallium, which provides a source of current carriers for injection into the cadmium-sulfide (CdS) material of the device. A lower layer 13 of high resistivity CdS material is deposited on the emitter electrode in a suitable manner discussed more fully below. During the deposition process, an injecting contact is formed at emitter electrode 11 at its boundary with the CdS layer so that a satisfactory injection of current carriers, in this case, electrons, is obtained.

During the evaporation portion of the deposition process, as discussed more completely below, the CdS material tends to dissociate into cadmium and sulfur atoms which then recombine to form CdS material. During the recombination phase, some sulfur atoms are lost and the material thereby becomes sulfur deficient. Although a blocking, or isolation, contact may often form between the lower, sulfur-deficient layer 13 and the grid structure when the latter is subsequently formed thereon, it has been found that such may not always be the case. In order to insure that effective isolation occurs and that such a blocking contact always exists, a layer 14 of isolation material is formed at the upper surface of lower CdS layer 13 by supplying a suitable material to make up the sulfur atom deficiency in the surface portion of lower CdS layer 13. As explained more fully in later paragraphs, such deficiencies can be supplied in many ways to provide an isolation layer 14 between lower CdS layer 13 and the subsequently formed grid structure.

A mesh-like grid structure 15 is then formed on isolation layer 14 and comprises metallic grid element 16 having a plurality of grid apertures 17 therein. The grid structure is preferably made of aluminum and is suitably formed in a manner described more fully in subsequent paragraphs. In order to isolate grid structure 15 from the upper CdS layer which is subsequently deposited thereon, layer 18 of aluminum oxide ($Al_2O_3$) is formed on the surfaces of the metallic grid element 16 as shown. An upper layer 19 of CdS material is then deposited on the grid structure in a manner similar to that shown with respect to lower CdS layer 13. A collector electrode 20, of either gold, gallium or indium, for example, is thereupon deposited on upper CdS layer 19 to complete the solid state triode structure.

The structure of FIG. 1 can be used as a solid state triode, a simple illustration of which is shown in FIG. 2 where CdS layers, or zones, 13 and 19 are biased positive with respect to grid 15 (via electrodes 11 and 20, respectively) by batteries 21 and 22, zone 19 being positive with respect to zone 13. A load represented by block 23 is connected between emitter, or source, 11 and collector, or drain, 20 and signals to be translated are impressed between emitter 11 and grid 15 as by way of an input transformer 24.

When collector electrode 20 is made strongly positive with respect to emitter electrode 11, electrons are injected into zone 13 to form a space charge region, such electrons being drawn from the space charge region to collector electrode 20 during operation to produce a space-charge-limited current. The field resulting from the electron flow from emitter to collector, and, hence, the collector and load currents, is amenable to control or modulation by grid 15 in accordance with variations in the potential of such grid in accordance with input signals supplied to transformer 24. Variations in the potential of grid 15 will vary correspondingly the field acting to draw electrons from the emitter to the collector and thus produce corresponding changes in current supplied to load 23. Since the grid is effectively isolated from the CdS conductivity zones, no injection or withdrawal of current carriers (i.e., no effective grid current) will be drawn as discussed above.

In order to fabricate the device shown in FIG. 1 in accordance with the invention, the following preferred method is used.

STEP 1. PREPARATION OF THE SUBSTRATE

The surface of the substrate on which the device is mounted, such as glass or other suitable dielectric material, is first cleaned by appropriate and conventional cleaning methods, including suitable ultrasonic cleaning techniques, rinsing with distilled water and/or bathing in alcohol, all of which methods are well known to those in the art.

STEP 2. DEPOSITION OF THE EMITTER ELECTRODE

Once the glass substrate has been appropriately prepared, a layer of metallic material, for providing an emitter electrode (such as electrode 11 in FIG. 1) to inject current carriers, is deposited on the surface of the glass substrate. Such deposition can be carried out by evaporation techniques wherein the metal, which in a preferred embodiment may be gold, for example, is placed in a molybdenum boat source and is heated to a temperature of approximately 1500°C to obtain satisfactory evaporation. The vapor then condenses on the glass substrate, which is maintained at room temperature, to form an appropriate electrode, the thickness of which is approximately 400. Indium or gallium may also be used to form such emitter electrode.

STEP 3. DEPOSITION OF THE LOWER CdS LAYER

Following the electrode deposition, a first lower layer of high resistivity cadmium sulfide, such as that designated as lower CdS layer 13 in FIG. 1, is then deposited on the emitter electrode. Such CdS layer is also formed by using evaporation-deposition techniques wherein powdered CdS material is placed in a molybdenum boat source and heated to an appropriate evaporation temperature approximately equal to or greater than 750° C. The glass-emitter substrate combination is maintained at a temperature of about 100°C during the deposition process. The deposition of such layer thereby provides a first CdS zone which upon deposition may have a resistivity of less than $10^4$ ohm-cm. and for that reason may not always be capable of supporting a space charge region when current carriers are injected from the emitter electrode.

It has been found, however, that the resistivity of such CdS layer may be increased by post-deposition heating thereof, which technique may be used following the deposition process described above. Alternatively, such heating may not be necessary at this stage since the heating processes used in later steps, as described in the paragraphs which follow, will also serve to increase the resistivity of such CdS layer. At any rate, whether immediate post-deposition heating, or subsequent heating, is depended upon, the resistivity of lower CdS layer 13 ultimately increases to a value within the range from approximately $10^4$ ohm-cm. to $10^9$ ohm-cm., or higher, which range is sufficient to support a space charge region as required for space-charge-limited current operation.

It has further been found that evaporation of the CdS material on either gold, indium or gallium forms a satisfactory injecting contact between the emitter electrode and CdS layer 13 to provide for a suitable injection of electrons into the CdS zone during operation.

STEP 4. FORMATION OF THE ISOLATION LAYER

During the deposition of CdS layer 13, as described above in Step 3, the CdS material tends to dissociate on evaporation, forming atoms of cadmium and sulfur which upon condensation recombine to form a CdS layer which tends to be sulfur deficient, as discussed above. If a grid structure is thereafter formed on such sulfur-deficient CdS layer 13, isolation of the grid elements from the CdS material may not always result and if such isolation does not occur, injection or withdrawal of current carriers by the grid structure would take place during operation depending on the grid potential, a condition not desirable in the operation of the triode structure. In order to insure that such a situation is completely avoided, a layer of isolation material is formed between CdS layer 13 and the grid structure which is subsequently formed thereon. Such isolation layer may be formed by diffusing into the upper surface of CdS layer 13 a material which will make up for the deficiency of sulfur atoms in the recombined CdS material. One preferred method is to diffuse vaporized sulfur into the CdS material by appropriate heating methods so that it penetrates into the CdS layer and provides a sufficient number of sulfur atoms below the surface thereof to compensate for the deficiency introduced by the recombination process. Such diffusion process thereby forms a thin layer of isolation material at the surface of layer 13. As discussed above, such diffusion process involving the penetration of sulfur atoms beyond a few atomic layers also enhances the resistivity characteristics of CdS layer 13 so as to increase its capability for supporting a space charge region.

Other impurity materials can be utilized to produce such isolation layer. For example, copper or gold may also be diffused by conventional techniques utilizing heating processes into the lower CdS zone. In using such impurities, however, care must be taken that such diffusion does not result in over compensation for the sulfur deficiency such that a P-type material (which may not support a space charge region) is actually formed.

Alternatively, diffusion of oxygen into CdS layer 13 may also be utilized. In such a process the surface of the CdS layer 13 is exposed to a 100 micron Hg oxygen glow discharge (thereby forming oxygen ions) for about one hour with the CdS layer being maintained at a temperature of about 150° C. After discharge the vacuum is restored and the CdS layer is heated to about 325° C for one hour and then cooled to room temperature. Such oxygen ion bombardment produces an effective isolation layer by forming a combination of cadmium sulfide material and cadmium oxide material which provides a suitable blocking contact. Without special precautions as discussed below, however, the diffusion of oxygen may produce undesirable effects relative to the grid structure subsequently formed thereon. Avoidance of such effects is discussed more fully in a later paragraph.

Another method of forming such isolation layer is to subject the CdS material to relatively high temperatures, in the range of 400° to 500° C, in the presence of a suitable catalyst, such as gold or silver. In such process the catalyst material diffuses into the CdS material and forms nucleation centers about which the smaller crystals of CdS therein tend to agglomerate to form substantially larger crystals. In such recrystallization process the material near the surface of CdS layer 13 approaches the nature of a single crystal structure which structure causes such surface layer to function as an isolation layer between the subsequently formed grid structure and CdS zone 13.

Whatever method for forming an isolation layer is used, such layer, designated as layer 14 in FIG. 1, provides sufficient isolation, or blocking contact, between lower CdS zone 13 and the grid structure which is subsequently formed thereon to prevent injection or withdrawal of current carriers by the grid. Moreover, the heating processes used in such methods serve to increase the resistivity of lower CdS layer 13 and enhance its capability for supporting a space charge region. The thickness of such isolation layer will be less than 100.

STEP 5. DEPOSITION OF A SOLID ALUMINUM LAYER

Following the formation of isolation layer 14, a grid material, such as aluminum, is deposited as a continuous thin film onto such isolation layer. Such deposition may be performed by utilizing evaporation techniques, similar to those discussed above, wherein the metallic aluminum material is vaporized at a temperature of about 900° C and allowed to condense on isolation layer 14 which is maintained at room temperature. Thus, a substantially continuous, or solid, layer of aluminum approximately 100A. thick is deposited.

STEP 6. FORMATION OF A MESH-LIKE GRID STRUCTURE

Following the deposition of a thin film of solid aluminum, the material is heated, in an annealing process, at approximately 425° C. in a vacuum system at a pressure of about $10^{-5}$ mm. of Hg. An appropriate heating system for such annealing process comprises a radiation heater located in a position above the material. Heating the aluminum layer at such a temperature, following deposition of the solid layer of aluminum at room temperature, causes apertures to appear in the aluminum film and a mesh-like grid structure is thereby formed. As the grid structure is formed, the sheet resistance of the grid material gradually increases as the apertures grow larger during the heating process. The sheet resistance is continuously monitored throughout the annealing process until it reaches a suitable value of approximately 50 ohms/sq., which, it has been found, provides a very satisfactory grid mesh structure wherein the apertures are approximately 3000A. in diameter.

STEP 7. FORMATION OF AN ALUMINUM OXIDE LAYER

In order to provide appropriate isolation between the grid structure and upper CdS layer 19, the aluminum grid material is oxidized so that a layer of aluminum oxide ($Al_2O_3$) forms on the surface thereof to produce a blocking, or isolating, contact. The $Al_2O_3$ layer may be easily produced merely by exposing the grid material to air.

STEP 8. DEPOSITION OF THE UPPER CdS LAYER

The upper CdS layer 19 is then formed by suitable evaporation-deposition techniques in substantially the same manner as that discussed for lower CdS layer 13 except that no post-deposition heating processes are required, since no space charge region is supported therein. Following such deposition an appropriate zone for supporting the conduction of an electron current is produced above the grid structure, the latter being effectively sandwiched between conductive CdS zones 13 and 19 as shown in FIG. 1. Upper CdS layer 19 is approximately 4800A thick.

STEP 9. DEPOSITION OF THE COLLECTOR ELECTRODE

The collector, or drain, electrode is then formed, again by suitable evaporation-deposition techniques, to produce a collector electrode 20, as shown in FIG. 1, in substantially the same manner as discussed with respect to emitter electrode 11. The collector electrode may be of a suitable material, such as gold, indium or gallium, and can be made approximately 400A. thick, or greater if desired.

It should be noted that, apart from the limitation imposed by the aperture sizes of the grid structure, the surface area of the device formed from the above layers theoretically may be made as small as appropriate masking techniques will allow. The area used may depend on the application in which the device is used and upon the density of devices which are required in a given volume.

In the alternative method discussed above (see Step 4) for producing isolation layer 14 wherein oxygen is introduced into the sulfur-deficient CdS material, it has been found that the aluminum grid elements may become so oxidized during the annealing process (see Step 6) that little or no metallic aluminum remains for providing a satisfactory grid structure. It is believed that such a result may occur because of the presence of oxygen atoms trapped below the grid structure during deposition of the latter, which atoms may ultimately migrate to the grid element to substantially convert the latter into aluminum oxide rather than metallic aluminum. At any rate, such a situation can be avoided if the annealing process (see Step 6) is performed substantially immediately following the deposition of the solid layer of aluminum discussed above (see Step 5). If substantially no time lapse occurs between deposition and annealing, such migration is apparently prevented and a metallic aluminum grid structure is maintained.

Although the above structure and method of the invention describes a preferred embodiment of the invention, other equivalents will occur to those skilled in the art within the scope of this invention. Hence, the invention is not to be construed as limited to the particular embodiments specifically shown in the drawing or described herein, except as defined by the appended claims.

What is claimed is:

1. A method of making a solid state device comprising the steps of:
   depositing a metallic emitter electrode on a dielectric substrate;
   depositing a first layer of material capable of supporting a space charge region for providing a sapce-charge-limited current on said first electrode;
   diffusing into said first layer a material capable of pro-ducing a first isolation layer at the upper surface thereof;
   forming a grid control electrode on said first insolation layer by depositing a thin film of solid aluminum on said first isolation layer, and
   heating said thin film to approximately 425° to provide a plurality of apertures therein to form said grid control electrode structure;
   said first isolatioin layer providing a blocking contact between said grid electrode and said first layer;
   forming a second isolation layer on said grid control electrode;
   depositing a second layer of material capable of supporting a space-charge-limited current on said second isolation layer, said second isolation layer thereby providing a blocking contact between said grid electrode and said second layer; and
   depositing a metallic collector electrode on said second layer.

2. A method of making a solid state device comprising the steps of:
   depositing a metallic emitter electrode on a dielectric substrate;
   depositing a first layer of material capable of supporting a space charge region for providing a space-charge-limited current on said first electrode,
   said first layer comprises cadmium sulfide material having a sufficient resistivity to support said space charge region and said grid control electrode comprises aluminum;
   diffusing into said first layer a material capable of producing a first isolation layer at the upper surface thereof;
   forming a grid control electrode on said first isolation layer, said first isolation layer providing a blocking contact between said grid electrode and said first layer;
   forming a second isolation layer on said grid control electrode;
   depositing a second layer of material capable of supporting a space-charge-limited current on said second isolation layer, said second isolation layer thereby providing a blocking contact between said grid electrode and said second layer; and
   depositing a metallic collector electrode on said second layer,
   said first isolation layer is formed by diffusing sulfur into said first cadmium sulfide layer whereby an isolation layer is formed near the upper surface thereof; and
   said second isolation layer is formed by exposing said grid control electrode to air to produce an aluminum oxide coating thereon.

3. A method of making a solid state device comprising the steps of
   preparing the surface of a dielectric substrate by cleaning the impurities therefrom;
   evaporating a metallic material and condensing said evaporated material onto said substrate while said substrate is maintained at room temperature to form an emitter electrode thereon;
   evaporating cadmium sulfide material at a temperature of approximately 750° C. and condensing said evaporated material onto said emitter electrode, said emitter electrode being maintained at approximately 100°C, to form a first layer of cadmium sulfide material having a resistivity sufficient to support a space charge region for providing a space-charge-limited current;
   diffusing sulfur into said first layer of cadmium sulfide material to form a first isolation layer at the surface of said first cadmium sulfide layer;
   evaporating metallic aluminum material at a temperature of approximately 900°C. and condensing said evaporated material onto said first isolation layer, said isolation layer being maintained at approximately room temperature, to form a thin film of solid aluminum thereon;
   heating such thin film at approximately 425° C. in a vacuum system at a pressure of about $10^{-5}$ mm. of Hg. to form a plurality of apertures therein to provide a mesh-like grid structure;
   exposing said grid structure to air to form a layer of aluminum oxide on the metallic portion of said grid structure;
   evaporating cadmium sulfide material at approximately 750° C. to form a second cadmium sulfide layer on said grid structure capable of supporting a space-charge-limited current;

evaporating a metallic material and condensing said evaporated material onto said second cadmium sulfide layer to provide a collector electrode.

4. The method of making a solid state device in accordance with claim 3 wherein said emitter electrode and said collector electrode are made of gold and the evaporation thereof is performed at approximately 1,500° C.

5. The method of making a solid state device in accordance with claim 3 wherein
   said emitter and said collector electrodes are approximately 400A. thick;
   said first cadmium sulfide layer is between approximately 4,800A. and 9600A. thick;
   said first isolation layer is less than 100A. thick;
   said grid structure is approximately 100A. thick; and
   said second cadmium sulfide layer is approximately 4,800A.

* * * * *